TRANSMISSION CHANNEL SWITCHING DEVICE RESPONSIVE TO CHANNEL NOISE

Filed July 12, 1965

INVENTORS
JOHN R. REYNDERS &
ADRIANUS KEGEL
BY
Frank R. Jifari
AGENT

United States Patent Office 3,365,666

Patented Jan. 23, 1968

3,365,666
TRANSMISSION CHANNEL SWITCHING DEVICE RESPONSIVE TO CHANNEL NOISE

John Richard Reynders, Hilversum, and Adrianus Kegel, Delft, Netherlands, assignors to North American Philips Company, Inc., New York, N.Y., a corporation of Delaware Filed July 12, 1965, Ser. No. 471,076
Claims priority, application Netherlands, July 29, 1964, 64—8,627
14 Claims. (Cl. 325—2)

ABSTRACT OF THE DISCLOSURE

A transmission system for selectively connecting a pair of transmission channels to an output circuit includes means responsive to a predetermined difference between the noise levels in the two channels for controlling the switching of the output circuit to the two channels. The control voltage for effecting the switching includes means for producing sinusoidal voltages proportional to the noise levels, and means for comparing the phases of the sum and difference of the sinusoidal voltages.

The invention relates to a transmission device comprising a first transmission channel and a second transmission channel serving as a spare channel. Each of the channels has a noise receiver which controls a switching voltage generator. The device also comprises a commutation unit controlled by the switching-voltage generator for producing a commutation from the first transmission channel to the second transmission channel, which may be an amplifying station in a unidirectional beam communication system.

An object of the invention is to provide a transmission device of the above type, comprising a switching-voltage generator which performs a commutation from the first transmission channel to the second transmission channel at a predetermined difference between the noise levels in the two channels measured in decibels independently of the absolute magnitude of the noise received in the noise receivers. The generator is distinguished by an extreme independence of the elements employed, troublesome reciprocatory switching over is avoided and the adjustment is simple.

According to the invention, the switching-voltage generator is provided with two channels connected to the outputs of the noise receivers, each channel including a converting member connected to a common oscillator for converting the incoming noise signal into a sinusoidal voltage proportional to the noise level. Each of the channels includes, in addition, an adjustable attenuator. At least one of the channels comprises a phase shifting network. The output voltages of the two channels are applied to an add circuit and to a subtract circuit, the output circuits of which are connected to a phase measuring member. The switching voltage for the commutation unit is derived. At the time of the change-over from the first transmission channel to the second transmission channel, in addition, a commutation of the adjustable attenuators in the two channels of the switching-voltage generator is performed.

The invention and its advantages will now be described more fully with reference to the figures.

Figure 1:
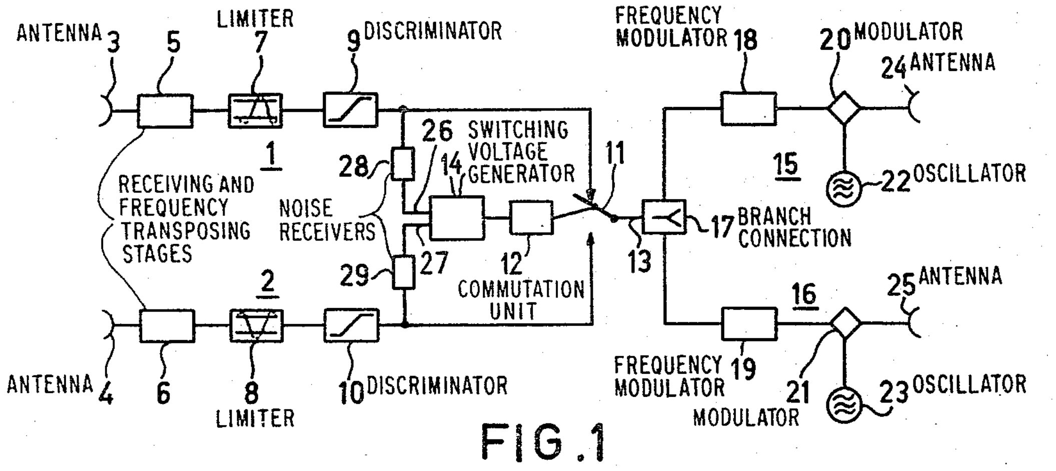
Figure 2:
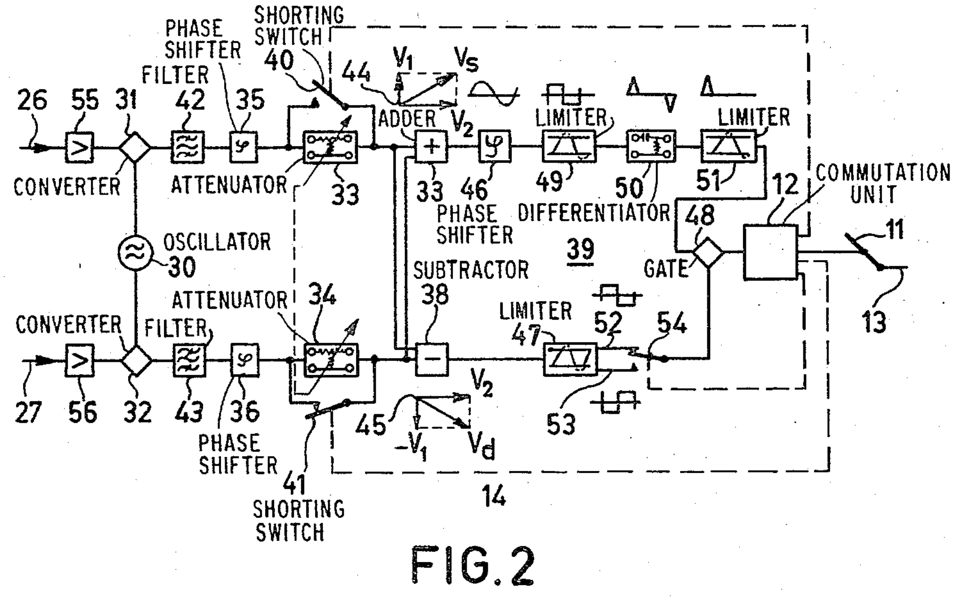

FIG. 1 shows an amplifying station in a unidirectional beam communication system according to the invention and FIG. 2 shows the structure of the switching-voltage generator employed therein.

The amplifying station of the unidirectional beam system according to the invention is suitable for the transmission of for example 960 speech channels or a television signal of 5 mc./s., the signals being transmitted by frequency modulation in two frequency bands, for example of 3882.5 mc./s. and 3940.5 mc./s.

In the amplifying station shown the signals transmitted in the frequency bands of 3882.5 mc./s. and 3940.5 mc./s. are received in separate receiving channels 1, 2 by way of the antennas 3, 4, and receiving stages 5, 6. The receivers each comprise a mixing stage for frequency transposition of the incoming signals to the 70 mc./s. intermediate-frequency band, and a further intermediate-frequency amplifier. In each of the receiving channels 1, 2 the amplified intermediate-frequency signals are applied through a limiter 7, 8 to a frequency discriminator 9, 10. The output circuit of one discriminator, for example of the frequency discriminator 9 of the receiving channel 1, is connected through a switch 11 of a commutation unit 12 to the input conductor 13 of the transmitter part of the amplifying station in the unidirectional beam system. The commutation unit 12 is governed by a switching-voltage generator 14, which produces a change-over in a manner to be described more fully hereinafter from the receiving channel 1 to the spare receiving channel 2.

Like the receiver part of the amplifying station the transmitter part comprises two channels 15, 16, which are connected through a branch connection 17 to the conductor 13. Each of the transmitter channels 15, 16 are provided with a frequency modulator 18, 19, followed by a transmitter modulator 20, 21 with the local oscillator 22, 23, connected thereto. The modulators 20, 21 transpose the incoming signals to frequency bands of for example 3911.5 mc./s. and 3969.5 mc./s. respectively. The frequency bands of 3911.5 mc./s. and 3969.5 mc./s. are transmitted through transmitting aerials 24, 25.

The switching voltage generator 14 controlling the commutation unit 12 comprises two channels 26, 27, to which a voltage characteristic of the noise level in the two receiving channels 1, 2 is applied. This voltage is derived from noise receivers 28, 29, connected to the two channels 1, 2. The noise receivers 28, 29 may be constructed in a conventional manner for the reception and detection of noise in a noise signal band of given bandwidth lying outside the signal band, for example, a bandwidth of 40 kc./s., particularly the noise in a signal band of a pilot signal transmitted simultaneously at a frequency outside the signal band.

In accordance with the invention a commutation from the receiving channel 1 to the spare channel 2 is performed independently of the absolute magnitude of a given difference, measured in decibels between the noise levels of the two receiving channels 1, 2, by constructing the switching-voltage generator 14 in the manner illustrated in FIG. 2. The input terminals of the channels 26, 27 are connected to the output circuits of the noise receivers 28, 29. Each of the two channels 26, 27 of the switching-voltage generator 14 is provided with a converting member 31, 32, connected to a common oscillator 30 for converting the noise level applied to the input terminals into a sinusoidal voltage proportional to said level. Each of the channels 26, 27 includes, moreover, an adjustable attenuator 33, 34, and a 45° leading and a 45° lagging phase-shifting network 35, 36. The output voltages of the channels are applied to an add circuit 37 and a subtract circuit 38. The output circuits of said add circuit and subtract circuit 37, 38 are connected to a phase measuring member 39, from which the switching voltage for the commutation unit 12 is derived. This switching voltage controls, at the change-over from the first transmission channel 1 to the spare receiving channel 2, in addition, a change-over of the adjustable attenuators 33, 34 in the two channels 26, 27 of the switching voltage generator. The adjustable attenuators 33, 34 are simultaneously adjustable and shunted by short-circuit switches 40, 41, the switch 40 being opened and the switch 41 being closed in the operational condition shown, whereas after the change-over the switch 40 is closed and the switch 41 is open.

In the construction shown the converting members 31, 32, connected to the common oscillator, are normally cut-off amplitude modulators. The output circuit of the modulators includes a filter 42, 43 tuned to the oscillator frequency of for example 1 kc./s. The two amplitude modulators 31, 32 are alternately released by the oscillator voltages. In accordance with the magnitude of the noise level at the input terminals of the channels 26, 27 a sinusoidal oscillation of the oscillator frequency with an amplitude depending upon the noise level appears at the output filters 42, 43 of the amplitude modulators 31, 32. This oscillation is further processed in the channels 26, 27 of the switching-voltage generator 14.

In the channel 26 the output signal of the amplitude modulator 31 is applied through the non-shortcircuited adjustable attenuator 33, the degree of attenuation of which may be adjusted to 5 db, and through the 45° leading phase-shifting network 35, to the inputs of the add and subtract circuits 37, 38. In the channel 27 the output signal is applied via the 45° lagging phase-shifting network 36 and the short-circuited adjustable attenuator 34 to the inputs of the add and subtract circuits 37, 38. Designating the voltage at the input of the add and subtract circuits 37, 38 from the channel 26 by $V_1$ and from the channel 27 by $V_2$, the voltages $V_s$ and $V_d$ are obtained by addition and subtraction in the add and subtract circuits 37, 38 as is indicated in the vector diagrams 44, 45. These voltages are applied to the phase measuring member 39 for producing, by phase measurement, the switching voltage for the commutation unit 12.

The phase relationship between the voltages $V_s$ and $V_d$ of equal amplitudes provides a sharp indication of the ratio between the noise levels in the two channels 26, 27. If in the embodiment shown in which the attenuator 33 is adjusted to 5 db, the noise level of the receiving channel 1 increases with respect to that of the receiving channel 2, the vector $V_1$ will increase and hence the phase difference between the sum and difference vectors $V_s$ and $V_d$ will also increase, so that at the passage of a relative phase shift of 90° between the vectors $V_s$ and $V_d$ the phase measuring member 39 produces a switching voltage. The switching voltage causes via the switch 11 of the commutation unit 12, a change over to the spare receiving channel 2. At the instant when the vectors $V_s$ and $V_d$ have a phase difference of 90°, the voltage $V_1$ equalises the voltage $V_2$, which means, with the adjustment of the attenuator 33 at 5 db, that the noise level of the receiving channel 1 is just 5 db higher than that of the receiving channel 2.

At the same time that the change-over to the receiving channel 2 is performed, the commutation unit 12 opens the short-circuit switch 41 of the adjustable attenuator 34 and closes the short-circuit switch 40 of the adjustable attenuator 33, so that the output voltage of the amplitude modulator 32 in the attenuator 34 is attenuated by 5 db and the ouput voltage of the amplitude modulator 31 is not attenuated, since the attenuator 33 is short-circuited. If the noise level of the receiving channel 1 decreases, the commutation unit 12 will produce a change-over to the initial state at the passage of a phase shift of 90° between the vectors $V_s$ and $V_d$, that is, when the noise level of the receiving channel 1 is 5 db lower than that of the receiving channel 2. The receiving channel 1 is connected through the switch 11 to the conductor 13, and the short-circuit switch 40 of the adjustable attenuator 33 is opened and the short-circuit switch 41 of the adjustable attenuator 34 is closed.

In this manner an accurate change-over is obtained, which depends only upon the difference in noise levels in the two receiving channels 1, 2 and does not depend upon the absolute value of the noise level. Troublesome reciprocatory switching is avoided due to the change-over of the adjustable attenuators 33, 34. The adjustment of the commutation at a given difference in noise levels is particularly simple, since it is only necessary to adjust the adjustable attenuators 33, 34 to the desired degree of attenuation. Moreover, also due to the substantially identical construction of the channels of the switching-voltage generator, the operation is not very dependent upon the elements employed, for example upon ageing, mains voltage fluctuations and the like.

The phase measuring member 39 included in the switching-voltage generator 14 in the embodiment shown, which as stated above, responds at the passage of a phase difference of 90° between the sum voltage $V_s$ and the difference voltage $V_d$, is constructed along pulse-technological lines. The output voltage of the add circuit 37 is applied through a 90° phase shifting network 46 to a pulse producer for producing pulses, the instants of which coincide with the instants when the sinusoidal voltage derived from the 90° phase-shifting network 46 passes through the zero axis in the positive direction. The output voltage of the subtract circuit 38 is applied to a bilateral limiter 47 for producing gate pulses for a gate 48, to which the pulses of the pulse producer are applied. The pulse producer comprises the cascade connection of the bilaterial limiter 49, a differentiating network 50 and a limiter 51, which suppresses the pulses produced by differentiation with negative polarity. The bilateral limiter 47 connected to the subtract circuit 38 is provided with two output circuits 52, 53 of opposite voltages, one of said output circuits 52 being connected through a switch 54 of the commutation unit 12, to the gate 48. For the sake of clarity the waveforms are indicated above the said elements of the phase measuring member 39.

When in the device so far described the sum voltage $V_s$ and the difference voltage $V_d$ pass through a phase difference of 90°, the output voltage of the 90° phase shifting network 46, connected to the add circuit 37, will at this instant be in co-phase with the output voltage of the subtract circuit 38, so that the ouput pulse of the pulse producer 49, 50, 51 is passed only at this instant through the gate 48 to the commutation unit 12, which thus produces a change-over. As before, the receiving channel 2 is connected to the conductor 13 in the commutated state and the short-circuit switches 40, 41 of the adjustable attenuators 33, 34 are closed and opened respectively, and the output circuit 53 of the bilateral limiter 47 is connected to the gate 48 by means of a switch 54.

The change-over from the commutated state to the initial state is performed in a similar manner and by the change-over of the output circuit of the bilateral limiter 47 to the gate 48 an output pulse from the pulse producer 49, 50, 51 is passed at the passage of a relative phase shift of 90° between the sum voltage $V_s$ and the difference voltage $V_d$ via the gate 48, said pulse producing a change-over to the initial state. Thus the device re-occupies its initial position, in which the receiving channel 1 is connected to the conductor 13. The short-circuit switches 40, 41 of the adjustable attenuators 33, 34 are then opened and closed respectively and the output circuit 52 of the bilateral limiter 47 is connected to the gate 48.

At the appearance of a difference between the adjusted noise levels of the receiving channels 1, 2 the pulse-operated phase measuring member 39 produces a change-over accurately at the instant, when the pulse produced in the pulse producer 49, 50, 51 is passed through the gate 48 and as stated above said pulse produces the change-over via the commutation unit 12. It should be noted that it is possible to connect the branch including the bilateral limiter 47 of the phase measuring member 39 to the add circuit 37 and the branch including the pulse producer 49, 50, 51 to the subtract circuit 38 without losing the above advantages. The 90° phase shifting network 46 may also be included in the branch having the bilateral limiter 47 or a 45° leading network and a 45° lagging network may be included in each of the branches respectively.

Under certain conditions, particularly if very great differences in the noise levels may occur in the receiving channels 1, 2, it is advantageous to reduce these noise level differences, while the aforesaid effect is maintained. This is achieved in a simple manner by including in the two channels 26, 27 of the switching-voltage generator 14 an instantaneous compression member 55, 56, which may be an amplifier with a non-linear output resistor comprised of diodes. The compression member reduces the noise level differences measured in decibels by a given factor, for example a factor 2. If in this device a change-over is desired at a difference of noise levels of 5 db in the receiving channels 1, 2, as stated above, it is necessary to adjust the reducing factors of the adjustable attenuators 33, 34 to 5/2=2.5 db when the instantaneous compression members 55, 56 are used, since the latter reduce the noise level differences by a factor 2.

It should furthermore be noted herein that instead of a 45° leading network 35 and a 45° lagging network 35, 36 in the two channels 26, 27 of the switching-voltage generator 14 use may be made of a 90° phase shifting network in one of the channels. In this respect it is advantageous to include in the other channel a frequency-independent damping network which has the same damping factor for the applied sinusoidal oscillation as the 90° phase shifting network. It is furthermore stated that apart from the change-over at a given noise level difference in the receiving channels 1, 2 the commutation unit 12 is also capable of producing a change-over when a pilot signal fails to appear or when the absolute noise level is excessively high, as described for example in "Bell System Technical Journal" 1960, pages 821 to 877.

What is claimed is:

1. In a transmission device comprising an operative transmission channel and a spare transmission channel, means connecting each of said channels of a separate noise receiver for producing signals proportional to the noise in said channels, means connecting said noise receiver to a switching-voltage generator, a common output circuit, and a commutation unit controlled by the switching-voltage generator for selectively connecting said output circuit to the outputs of said transmission channels; the improvement wherein the switching-voltage generator comprises first and second channels each connected to the output of a separate noise receiver, each first and second channel including a converting member connected to a common oscillator, for converting the output of the respective noise receiver into a sinusoidal voltage proportional to the noise level, each of said first and second channels including, in addition, an adjustable attenuator, at least one of the first and second channels comprising a phase-shifting network, an add circuit, a subtract circuit, means applying the output voltages of said first and second channels to said add circuit and subtract circuit, a phase measuring member connected to the outputs of said add and subtract circuits from which the control-signal for the commutation unit is derived, and means responsive to switching of the outputs of said transmission channels for simultaneously changing the attenuation of the adjustable attenuators in the two channels of the switching-voltage generator.

2. A transmission device as claimed in claim 1, wherein the phase-shifting network included in at least one of the channels of the switching-voltage generator produces a phase shift of 90° between said channels.

3. A transmission device as claimed in claim 1 wherein the first and second channels of the switching-voltage generator include a 45° leading network and a 45° lagging network respectively.

4. A transmission device as claimed in claim 1 wherein the adjustable attenuators in the two channels of the switching-voltage generator are shunted by short-circuit switches, and means for alternately opening said switches upon switching of said transmission channels.

5. A transmission device as claimed in claim 4, wherein the adjustable attenuators are simultaneously adjustable.

6. A transmission device as claimed in claim 1 wherein each of the first and second channels includes an instantaneous compressor formed by an amplifier with a non-linear resistance, which reduces by a given factor the applied noise level, measured in decibels.

7. A transmission device as claimed in claim 1 wherein upon the passage of a phase difference of 90° between the output voltages of the add circuit and the subtract circuit the phase measuring member produces a control voltage to switch said transmission channels.

8. A transmission device as claimed in claim 7, wherein the add circuit and the subtract circuit are connected to a branch of the phase measuring member, one branch including a pulse producer for producing pulses to be applied to a gate circuit, whereas the other branch of the phase measuring member includes a bilateral limiter having output circuits at opposite voltages for producing pulses for the gate circuit, one of the output circuits being connected through a switch to the gate circuit, at least one of the branches of the phase measuring member including a 90° phase shifting network, and means for deriving switching pulses for the commutation unit from the gate circuit, said unit including means for controlling said switch in the output circuit of said limiter to alternately connect the outputs of said limiter to said gate circuit upon switching of said transmission channels.

9. A transmission device as claimed in claim 8, wherein the pulse producer is formed by a bilateral limiter, a differentiating network and a subsequent limiter, which suppresses the pulses of one polarity produced by differentiation.

10. A transmission system comprising first and second signal transmission channels each having a signal input circuit and a signal output circuit, common output circuit means, means connected to said first and second channels for providing first and second sinusoidal voltages of a predetermined frequency and relative phase and having amplitudes that vary as a function of the amplitudes of noise signals in said first and second transmission channels respectively, means for providing third and fourth voltages proportional to the sum and difference of said first and second voltages respectively, and means responsive to the relative phases of said third and fourth voltages for selectively connecting said signal output circuits to said common output circuit.

11. A transmission system comprising first and second signal transmission channels each having a signal input circuit and a signal output circuit, a common output circuit, and means responsive to the noise levels in said first and second channels for selectively connecting said signal outputs to said common output circuit, said means responsive to noise levels comprising means for producing first and second sinusoidal voltages of a predetermined frequency and predetermined relative phases and having amplitudes proportional to the noise levels of said first and second channels respectively, means for producing third and fourth voltages proportional to the sum and difference of said first and second voltages respectively, and means responsive to the phase difference of said third and fourth voltages for producing a control voltage, commutating means, and means applying said control voltage to said commutating means for selectively connecting said signal output circuits to said common output circuit.

12. A transmission system comprising first and second signal transmission channels each having a signal input circuit and a signal output circuit, a common output circuit, first commutating means for selectively connecting one of said signal output circuits to said common output circuit, means for producing first and second voltages proportional to the noise in said first and second channels respectively, attenuator means, means applying said first and second voltages to said attenuator means, second commutating means connected to said attenuator means for selectively attenuating the one of said first and second voltages corresponding to the channel which is connected to said common output circuit, means connected to said attenuator means for producing a control voltage when the attenuated one of said first and second voltages exceeds the other of said first and second voltage, and means applying said control voltage to said first and second commutating means, said first and second commutating means being responsive to said control voltage for connecting the other of said signal output circuits to said common output circuit and for attenuating the other of said first and second voltages respectively.

13. A transmission system comprising first and second signal transmission channels each having an input circuit and an output circuit, a common output signal channel, means for providing first and second sinusoidal voltages of a predetermined frequency and relative phase and having amplitudes that vary as a function of noise signals in said first and second signal channels, first commutating means for selectively connecting said output circuits to said common output signal channel, attenuator means connected to attenuate said first and second voltages, means for producing third and fourth voltages proportional to the sum and difference respectively of said first and second voltages, phase detecting means for producing a control voltage responsive to the relative phases of said third and fourth voltages, second commutating means connected to selectively inhibit the attenuation of the one of said first and second voltages corresponding to the signal channel which is not connected to said common output signal channel, and means applying said control voltage to said first and second commutating means whereby said first commutating means connects said common output signal channel to the other signal channel and said second commutating means inhibits the attenuation of the other of said first and second voltages when the amplitude of the attenuated one of said first and second voltages exceeds the amplitude of the unattenuated one of said first and second voltages.

14. The system of claim 13, in which said phase detecting means comprises first and second branches, means applying said third and fourth voltages to said first and second branches respectively, gate circuit means, one of said branches comprising bilateral limiting means, means for differentiating the output of said limiting means, means for suppressing pulses of one polarity from said differentiating means, and means for applying the output of said suppressing means to said gate circuit means, the other of said branches comprising bilateral limiting means for producing fifth and sixth voltages of opposite polarity, and third commutating means for selectively connecting said fifth and sixth voltages to said gate circuit means, and means for deriving said control voltage from said gate circuit means.

References Cited

UNITED STATES PATENTS

| | | | |
|---|---|---|---|
| 2,229,158 | 1/1941 | Wilson | 333—3 |
| 2,823,351 | 2/1958 | Page | 324—99 |
| 2,892,930 | 6/1959 | Magnuski et al. | 325—56 |
| 3,189,822 | 6/1965 | Morita et al. | 325—304 X |
| 3,295,061 | 12/1966 | O'Hare | 324—140 |

JOHN W. CALDWELL, *Primary Examiner.*

B. V. SAFOUREK, *Assistant Examiner.*